United States Patent

[11] 3,630,762

[72] Inventors Robert N. Olton
Cleveland Heights, Ohio;
Bernard C. Berney, Indianapolis, Ind.
[21] Appl. No. 888,235
[22] Filed Dec. 29, 1969
[45] Patented Dec. 28, 1971
[73] Assignee Mineral Products Corporation
Cleveland Heights, Ohio

[54] WATERPROOFING BARRIER
9 Claims, 2 Drawing Figs.

[52] U.S. Cl. .................................. 106/2,
61/30, 106/33, 106/243, 106/306, 117/100,
161/182, 161/206, 161/271, 252/316, 252/317
[51] Int. Cl. .................................. C09k 3/00
[50] Field of Search .......................... 61/30;
106/33, 306, 243, 2; 117/100 B, 100 S; 161/206,
182, 271; 252/316, 317

[56] References Cited
UNITED STATES PATENTS
2,672,442  3/1954  Clem .................. 252/8.5

FOREIGN PATENTS
578,341  6/1959  Canada .................. 252/8.5

Primary Examiner—John T. Goolkasian
Assistant Examiner—Robert A. Dawson
Attorney—Bosworth, Sessions, Herrstrom & Cain ABSTRACT: A waterproofing barrier characterized by its controlled swelling when wet and comprising in admixture a water-swellable colloidal clay, such as bentonite, and a particulate, inorganic metal salt treated with an oleaginous carboxylic acid. Preferably, the metal salt is calcium carbonate, such as amorphous chalk, treated with an acid like oleic or stearic acids. The mixture is particularly adapted as a protective layer in a below grade concrete roof system, or the like, above which is a pavement, earth, walks, etc., are to be laid. The present mixture may be used alone as in layer form or in conjunction with an adjoining layer of water-swellable clay to form a multilayer barrier. Optionally, the mixture may include a finely divided siliceous mineral such as perlite as an additional ingredient.

PATENTED DEC 28 1971  3,630,762

INVENTORS.
ROBERT N. OLTON
BERNARD C. BERNEY
BY Roseurth Sessions,
Herrshom + Cain
ATTORNEYS.

WATERPROOFING BARRIER

BACKGROUND OF THE INVENTION

The present invention relates to a waterproofing barrier which reacts when wet to block leakage through it by swelling a controlled amount and, more particularly, to such a barrier comprising a water-swellable colloidal clay and a particulate, inorganic metal salt that has been treated with an oleaginous carboxylic acid, the latter serving to control the natural swelling of the clay while maintaining the integrity of the barrier.

The use of a water-swellable clay like bentonite to impede water seepage through a structural panel is known. Such clays have the capacity to swell and gelatinize upon contact with water and thereby block it flow. For example, U.S. Pat. No. 2,277,286 to Bechtner discloses the use of bentonite for this purpose. Also, U.S. Pat. No. 3,186,896 to Clem discloses a preformed moisture-impervious panel comprising a pair of spaced facing sheets interconnected by a corrugated strip. The voids between the strips and facing sheets are filled with a mass of colloidal clay such as bentonite. The panel form permits bentonite waterproofing barriers to be installed conveniently on and against vertical walls below grade, for example.

As stated in U.S. Pat. No. 2,277,286, bentonite has an extremely strong adsorptive power and can adsorb almost five times its weight of water. Commercial bentonite swells, when contacted with water, as much as 10 to 20 times its dry volume. Such swelling can generate appreciable pressures if confined. As a result, and contrary to the apparent teachings of U.S. Pat. Nos. 2,277,286 and 3,186,896, a layer consisting only of bentonite can swell sufficiently to cause heaving and displacement of a substantial overburden. Particularly when the waterproofing layer forms part of a substantially rigid underground roof system, the swelling of bentonite can cause commensurate displacement of earth fill and cracking and heaving of overhead rigid and semirigid pavements, etc.

Nevertheless, the practice has been to use waterproofing barriers of bentonite alone, even as preformed packages as in the case of the Clem U.S. Pat. No. 3,186,896. Although the swelling characteristics of clays like bentonite vary over a wide range, it is not possible to tell beforehand how much swelling can be tolerated in a given installation. The amount and kinds of impurities present also affect the swelling characteristics of bentonite. On the other hand, it would add substantially to the cost to manufacture the same waterproofing product with different, predetermined grades or amounts of swelling.

Accordingly, a waterproofing barrier containing a water-swellable clay like bentonite, but having controlled swelling and therefore adapted for generally universal application, would advance the art.

SUMMARY OF THE INVENTION

In order to blunt the expansion of a water-swellable clay like bentonite without losing appreciable waterproofing qualities, the present invention admixes with the clay a particulate inorganic salt treated with an oleaginous carboxylic acid, such as amorphous calcium carbonate treated with stearic acid. Upon wetting of the clay and salt, it is believed that the carboxylic acid component inhibits the swelling of the colloidal clay particles and thereby acts as a further control in their swelling characteristics. In the preferred form, a finely divided siliceous mineral is included, such as perlite or vermiculite.

The present waterproofing mixture is particularly useful as part of a roof system. In this and other similar installations, the mixture may be used alone or in conjunction with an adjoining layer of a water-soluble clay like bentonite to provide a multilayer, waterproofing barrier. Both layers cooperate in this embodiment to define a waterproofing barrier, the layer comprising the present mixture initially protecting the layer of water-swellable clay from being wetted and effectively reducing the swelling of the multilayer barrier as a unit upon inadvertent wetting of the all-clay layer.

DESCRIPTION OF THE PREFERRED EMBODIMENTS

Figure 1:
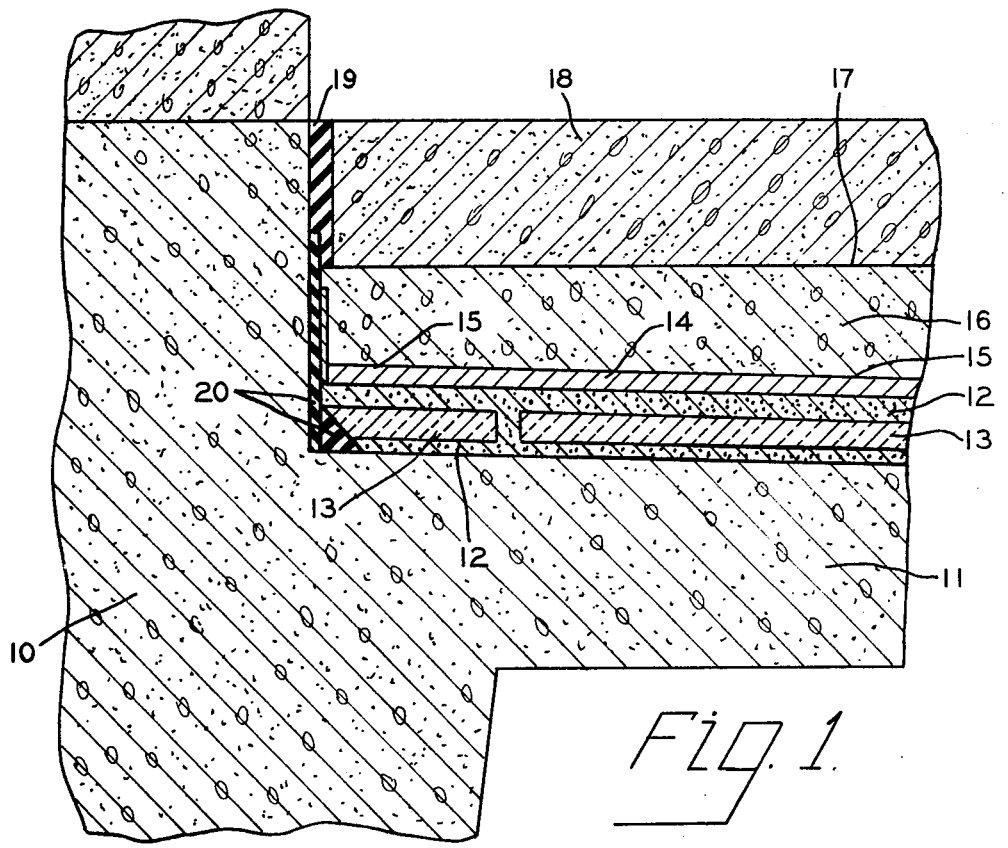
FIG. 1 is a fragmentary, vertical section of an underground, waterproofing roof deck system embodying the present waterproofing barrier.

A clay found to be best suited for the water-swellable clay of the present mixture is bentonite, such as southern bentonite, and particularly the bentonites found in the regions of Wyoming and South Dakota. However, other highly colloidal or bentonite clays which possess the property of swelling and gelatinizing in water to a substantial degree are also useful. The degree of their effectiveness depends upon the closeness with which their swelling properly corresponds to that of bentonite.

The strong adsorptive power of bentonite in particular is partially attributable to the preponderance of extremely small grains or particles which provide tremendous surface area for the adsorptive powers and the film-retaining capacity of the clay. Another factor is the distinctive nature of the particles themselves which are present in minute platelike structures that possess the peculiar property of allowing water molecules to penetrate their crystal lattice and expand it.

Bentonite in particular swells because it is composed primarily of the clay montmorillonite. The montmorillonite "flake" is anionic, that is, it carries a negative electrical charge. These charges are balanced by cations or positively charge atoms which are external to the crystal. In western-type bentonite found in Wyoming and the Dakotas, these cations are primarily sodium so that the western grades are sometimes called sodium bentonites or sodium montmorillonites. In southern-type bentonites, the cations are primarily calcium, and these clays are generally referred to as calcium bentonites. The calcium varieties do not swell as much as the sodium bentonites.

The colloidal bentonites may be used in various particle sizes. As a rule, the sizes of the dry particles may range from about fairly coarse granules of 4 mesh to an extremely fine powder of less than 325 mesh or 44 microns. In one useful grade of Wyoming bentonite, from 65 to 75 percent of the grains were finer than 0.2 micron and over 85 percent were finer than 2 microns. As bentonite swells, the particles become smaller and smaller. At complete hydration, the great majority of the particles are submicron in size. The specific gravity of dry bentonite is from about 2.3 to 2.9, depending in part on the degree of hydration and the sizing or grind which influences the packing of the particles.

The particulate, inorganic metal salt, treated with an oleaginous carboxylic acid, inhibits the swelling of the bentonite and yet does not adversely affect the waterproofing qualities. Indeed, the treated metal salt inherently possesses a natural water-resistant property as well as thermal insulating characteristics. The metal of the metal salt desirably is one from Group II of the Periodic Table of the Elements, especially calcium and barium. The salt radical is preferably one from an inorganic acid such as carbonic, sulfuric, and hydrochloric acids. Accordingly, the desired metal salts are calcium carbonate, calcium sulfate, calcium chloride, barium carbonate, barium sulfate, and barium chloride. Barium sulfate is normally used as the naturally occurring barytes. Of the metal salts, the preferred one is calcium carbonate, such as limestone, but especially the amorphous calcium carbonate appearing in nature as chalk. A highly useful form of such chalk is presently sold by Pluess-Staufer (North American) Inc. under the trademark PROTEXULATE.

The metal salt is aggregated into particle sizes for use in the mixture, the particles preferably ranging from about 0.5 to about 10 microns. In this form, the metal salt is treated with an oleaginous carboxylic acid. In general, such acids having from about 13 to about 22 carbon atoms are sufficiently oily to treat the salt. Both saturated and unsaturated and monocarboxylic and dicarboxylic acids are contemplated. Mixtures of the acids may be used. In the preferred practice, the particles are treated with stearic, isostearic, palmitic, oleic, or linoleic acids.

The acid treatment provides an outer coat or spherical encapsulation. In general, the metal salt having the described particle sizes is sifted into a chamber in which the acid is sprayed or atomized as a fine mist. When collected in the chamber, the metal salt particles have the desired acid coating. This provides an additional control on the swelling of the bentonite. When the acid-treated calcium carbonate becomes wet, as during water leakage through the mixture, it is believed that the transfer of the acid component onto the bentonite has an inhibiting influence on the swelling of the clay.

The bentonite and inorganic metal salt particles may be merely mechanically mixed together by any convenient means to form the mixture. The clay is present in an amount of about 7.5 to about 80 percent by volume, the balance comprising substantially the metal salt.

In order to decrease the bulk density of the described binary mixture and to improve its thermal insulating properties, it is preferred to include a finely divided siliceous mineral as a third ingredient. The mineral may be either perlite or vermiculite or compatible mixtures of the two. Perlite, which is preferred, is a volcanic glass which when expanded by heat forms a lightweight aggregate. Its particles measure about one thirty-second to one-eighth inch in diameter. Vermiculite comprises a number of micaceous minerals that are hydrous silicates, derived usually from alteration of mica, and whose granules also expand at elevated temperatures to provide a lightweight, highly water-absorbent material. Thin flakes of vermiculite measure about ¼×½ inch or smaller. As used in the present mixture, both perlite and vermiculite are preferably employed in their expanded forms. In the preferred practice, these components may be treated with liquid silicones to enhance the waterproofness of the mixture.

The siliceous mineral ingredient is merely mechanically mixed into the bentonite-metal salt mixture. Usually, substantially equal quantities of each of the three ingredients are used; but the bentonite may be present in an amount of about 7.5 percent to about 60 percent by volume, and each of the inorganic metal salt and the siliceous mineral may be present in amounts ranging from about 20 to about 60 percent by volume.

The following examples are intended to illustrate the invention and should not be construed as limiting the claims. In procuring the following data, the indicated volume proportions of the ingredients were placed in a circular mold having a diameter of 4 inches and compacted under a static pressure of 10,000 pounds per square foot to produce a test sample one-half inch in thickness. In all examples, calcium carbonate treated with stearic acid was used as the metal salt in order to provide a uniform basis of comparison. The calcium carbonate had a bulk density of about 55 to about 65 pounds per cubic foot. The perlite weighed about 7.5 to 8 pounds per cubic foot, and the vermiculite weighed about 6 to 7 pounds per cubic foot. The sample was completely saturated before testing by soaking in water for a minimum of 24 hours. During the permeability testing, an overburden pressure of 100 pounds per square foot was applied to the top of the test sample, and the rate of waterflow through the sample was recorded hourly. Various hydrostatic heads of water were applied during testing, each pressure head constituting a test run. The value of the coefficient of permeability was determined from the measured flow rates. In order to obtain the degree of swelling of a sample, the height of sample was recorded to the nearest one-twentieth of an inch under the various heads of water and calculated as a percentage increase in volume.

EXAMPLE 1

The test sample consisted of equal parts by volume of bentonite, vermiculite, and amorphous calcium carbonate. The results of the permeability test were:

| Test No. | Pressure Head in p.s.i. | Permeability in cm./sec. |
|---|---|---|
| 1 | 7 | $6 \times 10^{-10}$ |
| 2 | 10 | $1 \times 10^{-9}$ |
| 3 | 15 | $9 \times 10^{-10}$ |
| 4 | 30 | $7 \times 10^{-9}$ |

These are extremely low permeability rates. For example, a permeability of $10^{-9}$ centimeters per second is equivalent to a rate of 1 foot in 20 years. From a practical point of view, this means that any moisture movement through the material is so slow that evaporation would remove it. The low permeability rates were also achieved without any appreciable swell occurring in the material, although a slight swell is beneficial in order to choke off paths of moisture leakage. When bentonite is used alone, it may also have low permeability rates, but it may be attended by an appreciable swelling pressure which may crack a slab or floor deck.

EXAMPLE 2

Another mixture was prepared comprising equal parts by volume of bentonite, vermiculite, and amorphous calcium carbonate. The test data were:

| Test No. | Pressure Head p.s.i. | Permeability in cm./sec. |
|---|---|---|
| 1 | 7 | $6.0 \times 10^{-10}$ |
| 2 | 10 | $1.0 \times 10^{-9}$ |
| 3 | 15 | $9.0 \times 10^{-10}$ |
| 4 | 30 | $7.0 \times 10^{-9}$ |

EXAMPLE 3

In these test runs, a relatively low percentage of bentonite was used, that is, about 9.1 percent by volume of the mixture. The volume ratios of bentonite, vermiculite, and amorphous calcium carbonate were, respectively, 0.5:3:2. The test data showed:

| Test No. | Pressure Head p.s.i. | Permeability in cm./sec. |
|---|---|---|
| 1 | 1 | $5.0 \times 10^{-9}$ |
| 2 | 4 | $3.0 \times 10^{-8}$ |
| 3 | 5 | $3.8 \times 10^{-8}$ |
| 4 | 7 | $7.0 \times 10^{-8}$ |
| 5 | 8 | $6.3 \times 10^{-8}$ |
| 6 | 9 | $8.0 \times 10^{-8}$ |
| 7 | 10 | $7.5 \times 10^{-8}$ |
| 8 | 15 | $1.7 \times 10^{-7}$ |

EXAMPLE 4

The compositions tested in this example consisted of bentonite, perlite, and amorphous calcium carbonate in the volume ratio of 0.25:1.75:1, respectively. The permeability and swelling percentages were:

| Test No. | Pressure Head in p.s.i. | Permeability cm./sec. | % Swelling |
|---|---|---|---|

| Test No. | Pressure Head in p.s.i. | Permeability cm./sec. | % Swelling |
|---|---|---|---|
| 1 | 1 | $5.8\times10^{-8}$ | 0.5 |
| 2 | 2 | $9.0\times10^{-7}$ | 4.2 |
| 3 | 3 | $1.3\times10^{-6}$ | 4.2 |
| 4 | 4 | $9.1\times10^{-6}$ | 4.2 |
| 5 | 5 | $9.1\times10^{-6}$ | 4.2 |

EXAMPLE 5

Bentonite, perlite, and calcium carbonate were admixed in a volume ratio of 0.5:1.75:1, respectively. Under the increasing hydrostatic pressure heads, the permeability and swelling percentages were as follows. The marked increase in swelling percentages is significant as compared to the other examples, although the bentonite of this composition comprised only 15.4 percent by weight of the mixture.

| Test No. | Pressure Head in p.s.i. | Permeability cm./sec. | % Swelling |
|---|---|---|---|
| 1 | 1 | No Flow | 2.0 |
| 2 | 2 | No Flow | 12.0 |
| 3 | 3 | $9.4\times10^{-10}$ | 40.0 |
| 4 | 4 | $2.1\times10^{-9}$ | 41.0 |
| 5 | 5 | $3.6\times10^{-9}$ | 41.0 |
| 6 | 6 | $5.0\times10^{-9}$ | 41.0 |
| 7 | 7 | $3.6\times10^{-9}$ | 41.0 |
| 8 | 8 | $4.3\times10^{-9}$ | 41.0 |

EXAMPLE 6

The test composition of this example comprised bentonite, perlite, and amorphous calcium carbonate in a volume ratio of 0.25:1.5:1, respectively. The test data were:

| Test No. | Pressure Head in p.s.i. | Permeability in cm./sec. | % Swelling |
|---|---|---|---|
| 1 | 1 | No Flow | 2.3 |
| 2 | 2 | No Flow | 6.4 |
| 3 | 3 | $6.7\times10^{-10}$ | 12.0 |
| 4 | 4 | $2.1\times10^{-9}$ | 12.0 |
| 5 | 5 | $3.2\times10^{-9}$ | 12.5 |
| 6 | 6 | $3.3\times10^{-9}$ | 12.5 |
| 7 | 7 | $1.9\times10^{-9}$ | 12.5 |

EXAMPLE 7

The ternary mixture of this example included bentonite, perlite, and amorphous calcium carbonate in the volume ratio of 0.25:1.25:1, respectively. The test data were:

| Test No. | Pressure Head in p.s.i. | Permeability in cm./sec. | % Swelling |
|---|---|---|---|
| 1 | 1 | No Flow | 2.5 |
| 2 | 2 | No Flow | 6.3 |
| 3 | 3 | No Flow | 10.5 |
| 4 | 4 | $1.7\times10^{-9}$ | 11.0 |
| 5 | 5 | $3.4\times10^{-9}$ | 11.0 |
| 6 | 6 | $2.5\times10^{-9}$ | 11.0 |
| 7 | 7 | $1.5\times10^{-9}$ | 11.0 |

Figure 2:
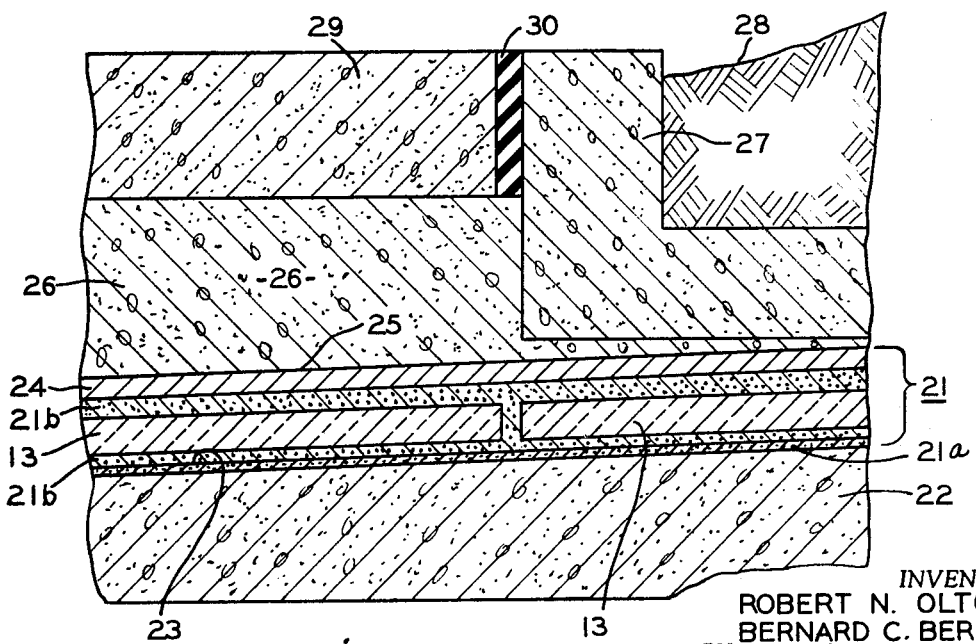
FIG. 2 is a fragmentary, vertical section of a ground-level roof deck system embodying the present waterproofing barrier in conjunction with a contiguous layer of bentonite to form a multilayer barrier.

FIGS. 1 and 2 illustrate two exemplary installations in which the present invention may be used. FIG. 1 illustrates the waterproofing detail for a plaza deck and embodies the use of a layer of the present mixture immediately above a surface to be protected and without an adjoining layer of bentonite. A concrete structure generally shown at 10 has a horizontally extending slab portion 11, the upper surface of which is to be protected against penetration by surface water. The structure 10 and slab 11 may, for example, form wall and roof parts of an underground parking garage.

A layer 12 of the present mixture is placed immediately above the slab 11. In the illustrated embodiment, the mixture of layer 12 is tamped beneath, about, and above batts 13 of conventional thermal insulation, such as bonded glass fiber or asbestos batts. A hardboard 14, such as gypsum or the like, lies over the mixture 12, and a sheet 15 of plastic, such as polyethylene, separates the board 14 from an overburden of gravel 16. Similarly, a plastic sheet 17 separates the gravel 16 from an overlay of concrete 18. The board 14 enables the layer 12 to be smoothed to a substantially uniform thickness as by rolling a compacting roller over the board. The plastic sheets 15 and 17 serve to prevent mixing of the gravel 16 with adjacent components. Earth or other fill may be substituted for concrete 18, as desired. Conventional seals, such as elastomeric compression seals 19 and 20, may also be used along the vertically disposed ends of the layers of the roof deck construction. Although sizes are not critical and depend upon a particular installation, the thickness of the layer 12 of the present mixture may range from about 3/8 to about 2.5 inches, including the insulating batts 13.

FIG. 2 illustrates the waterproofing details of a ground-level roof deck and embodies a multilayer barrier in which one layer comprises the present mixture and the other layer comprises essentially bentonite. More particularly, a multilayer barrier generally indicated at 21 overlies a concrete base slab 22. The barrier 21 comprises a layer 21a of bentonite atop the slab 22, and a layer 21b of the present mixture contacting layer 21a. As in FIG. 1, layer 21b can embody thermal insulating batts 13 of glass fibers or asbestos, around which the mixture 21b is compacted. A polyethylene film 23 preferably separates layers 21a and 21b. A hardboard 24, such as gypsum or the like, overlies the multilayer 21, and another polyethylene sheet 25 separates the hardboard 24 from gravel fill 26. The board 24 and plastic sheets 23 and 25 serve the same purpose as in the embodiment of FIG. 1.

An L-shaped concrete curb 27 is positioned within the gravel 26. An earth fill 28 lies to the right of the vertical extent of the curb 27, as viewed in FIG. 2, and a concrete slab 29 lies to the left, separated if desired as by an elastomeric compression seal 30. The layer 21b may have the same range of thicknesses as in FIG. 1. The layer 21a of bentonite may range from about one-eighth of an inch to one-half inch.

The waterproofing mixture of the present invention is nonflammable and nondeteriorating under the action of salts and other normal constituents of soil. The surface tension of the mixture is such that it has high resistance to infiltration of moisture even under saturated conditions. A layer of the present mixture, therefore, serves substantially as a water-impervious panel unless and until a puncture or rupture occurs in the compacted mass that is sufficiently large to admit moisture. This may occur in time due to shifting of the elements of the roof deck, erosion, and the like. As the water contacts the bentonite in the mixture, the bentonite swells and gelatinizes, blocking all leakage paths in the area. Indeed, for many relatively small punctures, the bentonite renders the present mixture self-sealing. This characteristic prevents the normally troublesome lateral or horizontal migration of moisture in the layers and especially along the horizontal interface of adjoining layers. Instead, the present waterproofing mixture is self-sealing and swells to localize the area of the invading moisture and prevent its further movement in any direction.

Normally, when encased between two fairly rigid surfaces, such as concrete or concrete and asphalt, wet bentonite causes the weaker of the surfaces to heave and crack under its pressurizing swell. However, in the present case the amount of swelling is controlled due to the mollifying effect of the carboxylic acid-treated metal salt and, is used, to the siliceous mineral. The oleaginous acid on the particles of the metal salt is believed also to inhibit the swelling of the bentonite upon being wetted and does not essentially impair the sealing ability of the bentonite. Even when the bentonite of the mixture does not sufficiently heave to displace other elements of a roof system.

When a layer of bentonite is used with a layer of the present mixture as in FIG. 2, the reaction in use is substantially the same, except that the layer of the mixture further initially prevents any penetration of water to the underlaying bentonite layer. In a severe fracture or shifting of the elements of the roof system such that moisture ultimately reaches the substantially all-bentonite layer 21a (sometimes caused by leakage along the vertically disposed ends of the roof deck system), the layer 21a swells and gelatinizes to a greater extent than layer 21b since the former contains more bentonite. In this respect, layer 21a is similar to a second line of defense. Yet, the amount of swell of the multilayer barrier 21 as a unit, that is, layers 21a and 21b combined is substantially less than if the multilayer barrier was composed entirely of bentonite. There is, therefore, a controlled swell and one that does not produce heaving or disrupture.

The applications of the waterproof barrier comprising this invention and shown and described herein are exemplary only. The multilayer barrier described in connection with the ground-level roof deck system can be used in below-grade applications including the one shown in FIG. 1, and the single layer barrier shown applied to a below-grade roof deck system can be used in ground-level applications including the one shown in FIG. 2. In addition, both forms of the invention can be used on above-grade roof deck systems.

It is understood that smaller amounts of other relatively inert ingredients may be tolerated in the mixture of the present invention, such as sand, gravel, earth, and the like, without destroying the advantages of the mixture.

Those skilled in the art will appreciate that various other changes and modifications may be made without departing from the spirit and scope of the invention.

What is claimed is:

1. A waterproofing barrier of controlled swelling comprising a mixture of a water-swellable colloidal clay and a particulate, inorganic metal salt encapsulated with an oleaginous carboxylic acid, the metal of the metal salt being selected from Group II of the Periodic Table of the Elements, said water-swellable clay being present in an amount of about 7.5 to about 80 percent by volume, the balance comprising substantially said encapsulated inorganic metal salt.

2. The waterproofing barrier of claim 1 wherein said colloidal clay is bentonite.

3. The waterproofing barrier of claim 1 wherein said inorganic metal salt is selected from the group consisting of calcium carbonate, calcium sulfate, calcium chloride, barium carbonate, barium sulfate, and barium chloride.

4. The waterproofing barrier of claim 1 wherein said inorganic metal salt is calcium carbonate.

5. The waterproofing barrier of claim 4 wherein said calcium carbonate is amorphous chalk.

6. The waterproofing barrier of claim 1 wherein said oleaginous carboxylic acid is selected from carboxylic acids having from 13 to 22 carbon atoms.

7. The waterproofing barrier of claim 1 including a finely divided siliceous mineral selected from the group consisting of perlite and vermiculite.

8. The waterproofing barrier of claim 7 wherein said water-swellable clay is present in an amount of about 7.5 to about 60 percent by volume, and each of said metal salt and siliceous mineral is present in an amount of about 20 to about 60 percent by volume.

9. A waterproofing barrier of claim 1 wherein said mixture is compacted, and a sufficient amount of said water-swellable clay is present to seal when wet relatively minor punctures in the compacted mixture.

* * * * *

UNITED STATES PATENT OFFICE
CERTIFICATE OF CORRECTION

Patent No. 3,630,762     Dated December 28, 1971

Inventor(s)  Robert N. Olton and Bernard C. Berney

It is certified that error appears in the above-identified patent and that said Letters Patent are hereby corrected as shown below:

Column 1, line 15, change "it" to be --its--;

4, lines 36 and 55, heading of second column in Examples 2 and 3, before "p.s.i." insert --in--;

5, In table comprising Example 4, at top of Column 5, figures denoting "Pressure Head" in Test Nos. 3, 4, and 5 should be aligned under heading;

6, line 69, change "is" to be --if--;

line 73, after "mixture" insert --swells, the mixture--.

Signed and sealed this 11th day of July 1972.

(SEAL)
Attest:

EDWARD M. FLETCHER, JR.
Attesting Officer

ROBERT GOTTSCHALK
Commissioner of Patents